(12) United States Patent
Shioyama et al.

(10) Patent No.: US 10,493,439 B2
(45) Date of Patent: Dec. 3, 2019

(54) CARBON-CONTAINING SOLID ACID HAVING SULFONATE GROUP

(71) Applicants: NATIONAL INSTITUTE OF ADVANCED INDUSTRIAL SCIENCE AND TECHNOLOGY, Tokyo (JP); NISSAN CHEMICAL INDUSTRIES, LTD., Tokyo (JP)

(72) Inventors: Hiroshi Shioyama, Osaka (JP); Hiroaki Sakurai, Osaka (JP); Qiang Xu, Osaka (JP); Masato Kiuchi, Osaka (JP); Yutaka Kimura, Tokyo (JP)

(73) Assignees: NATIONAL INSTITUTE OF ADVANCED INDUSTRIAL SCIENCE AND TECHNOLOGY (JP); NISSAN CHMICAL INDUSTRIES, LTD. (JP)

(*) Notice: Subject to any disclaimer, the term of this patent is extended or adjusted under 35 U.S.C. 154(b) by 0 days.

(21) Appl. No.: 14/904,497

(22) PCT Filed: Jun. 27, 2014

(86) PCT No.: PCT/JP2014/067186
§ 371 (c)(1),
(2) Date: Jan. 12, 2016

(87) PCT Pub. No.: WO2015/005144
PCT Pub. Date: Jan. 15, 2015

(65) Prior Publication Data
US 2016/0151766 A1    Jun. 2, 2016

(30) Foreign Application Priority Data
Jul. 12, 2013 (JP) .................................. 2013-145945

(51) Int. Cl.
*B01J 27/02* (2006.01)
*B01J 37/08* (2006.01)
(Continued)

(52) U.S. Cl.
CPC ............... *B01J 27/02* (2013.01); *B01J 21/02* (2013.01); *B01J 27/053* (2013.01); *B01J 27/20* (2013.01);
(Continued)

(58) Field of Classification Search
CPC . B01J 21/02; B01J 27/02; B01J 27/053; B01J 27/20; B01J 37/08; B01J 37/084; B01J 37/10
See application file for complete search history.

(56) References Cited

U.S. PATENT DOCUMENTS 7,335,790 B2    2/2008   Domen et al.
8,575,281 B2   11/2013   Yanagawa et al.
(Continued)

FOREIGN PATENT DOCUMENTS

JP    2004-238311 A    8/2004
JP    2006-257234 A    9/2006
(Continued)

OTHER PUBLICATIONS

Saidaminov, M.I. et al, "Expandable graphite modification by boric acid", Journal of Materials Research, Apr. 14, 2012, vol. 27, No. 7, pp. 1054-1059.
(Continued)

*Primary Examiner* — Shuangyi Abu Ali
(74) *Attorney, Agent, or Firm* — McDonald Hopkins LLC (57) ABSTRACT

[Problem] The main purpose is to provide a novel carbon-containing solid acid which has an excellent catalytic activity and of which the catalytic activity cannot be deteriorated easily even when used repeatedly. [Solution] A carbon-containing solid acid which comprises a carbonaceous material having a sulfonate group, wherein the carbonaceous material has a graphene structure in at least a part thereof and contains boron.

7 Claims, 1 Drawing Sheet

(51) Int. Cl.
*B01J 27/053* (2006.01)
*B01J 21/02* (2006.01)
*B01J 27/20* (2006.01)
*B01J 37/10* (2006.01)

(52) U.S. Cl.
CPC ............ *B01J 37/08* (2013.01); *B01J 37/084* (2013.01); *B01J 37/10* (2013.01)

(56) References Cited

U.S. PATENT DOCUMENTS

2009/0099345 A1    4/2009    Yanagawa et al.
2012/0063988 A1*  3/2012    Tour ...................... B82Y 30/00
                                                                 423/415.1

FOREIGN PATENT DOCUMENTS

| JP | 2011-098843 | 5/2011 |
| WO | 2007/105802 A1 | 9/2007 |
| WO | 2008/102913 A1 | 8/2008 |

OTHER PUBLICATIONS

Michikazu Hara, "Carbon, one of the most attractive and promising materials, Nanographen Solid Acid Catalyst", Catalyst, Jan. 15, 2009 (Jan. 15, 2009), vol. 51, No. 1, pp. 39 to 44.
English translation of International Search Report of PCT/JP2014/067186 dated Sep. 9, 2014.

* cited by examiner

CARBON-CONTAINING SOLID ACID HAVING SULFONATE GROUP

CROSS-REFERENCE TO RELATED APPLICATION

This application is a 35 U.S.C. 371 national stage filing of PCT Application No. PCT/JP2014/067186, filed on Jun. 27, 2014, which claims the benefit of Japanese Patent Application No. 2013-145945, filed on Jul. 12, 2013, both of which are incorporated herein in their entirety by reference.

TECHNICAL FIELD

The present invention relates to a sulfonic acid group-bearing carbon-based solid acid, a solid acid catalyst including it, and methods for producing them.

BACKGROUND

Conventionally, a variety of acid catalysts are used for a variety of chemical reactions such as esterification, hydrolysis, alkylation, dehydration condensation of alcohols, and hydration of olefins, and sulfuric acid is widely used as an acid catalyst in the chemical industry and other industries. Sulfuric acid is used in large amounts due to its low price. However, sulfuric acid, which is a liquid, has a problem in that a large amount of energy is required in the process of separating, recovering, purifying, and recycling sulfuric acid from products after reactions, the process of neutralizing residual sulfuric acid in products, the process of removing the salt produced by the neutralization, the wastewater treatment process, and other processes.

On the other hand, solid acid catalysts have also come to be used as alternatives to liquid acid catalysts such as sulfuric acid, because they can be more easily separated, recovered, and used repeatedly than liquid acids such as sulfuric acid.

Typical solid acid catalysts being used include silica-alumina, zeolite, and the like. However, these solid acid catalysts decrease in catalytic activity when used, for example, in water, and therefore are difficult to use industrially as alternatives to sulfuric acid.

In recent years, carbon-based solid acids having sulfonic acid groups introduced into carbonaceous materials have been developed as solid acid catalysts capable of being used even in water.

Concerning carbon-based solid acids having sulfonic acid groups introduced into carbonaceous materials, for example, Patent Document 1 discloses solid acids obtained by heating polycyclic aromatic hydrocarbons with concentrated or fuming sulfuric acid to condense and sulfonate the polycyclic aromatic hydrocarbons. For example, Patent Document 2 discloses a solid acid catalyst including a sulfonic acid group-containing carbonaceous material obtained by carbonizing and sulfonating phenolic resin. For example, Patent Document 3 discloses a solid acid obtained by partially carbonizing glucose, cellulose, or the like and then introducing sulfonic acid groups into the resulting amorphous carbon material.

However, these carbon-based solid acids have a problem in that they have insufficient catalytic activity or can easily decrease in catalytic activity when used repeatedly. Under such circumstances, there has been a demand for the development of a novel carbon-based solid acid that has high catalytic activity and resists degradation of its catalytic activity even when used repeatedly.

PRIOR ART DOCUMENTS

Patent Documents

Patent Document 1: Japanese Patent Laid-open Publication No. 2004-238311
Patent Document 2: International Patent Publication No. WO 2008/102913 Patent Document 3: Japanese Patent Laid-open Publication No. 2006-257234

SUMMARY OF THE INVENTION

Problems to be Solved by the Invention

It is a principal object of the present invention to provide a novel carbon-based solid acid that has high catalytic activity and resists degradation of its catalytic activity even when used repeatedly. It is a further object of the present invention to provide a carbon-based solid acid catalyst including such a carbon-based solid acid and to provide methods for producing them.

Means for Solving the Problem

The inventors have conducted intensive studies to solve the above problems. As a result, the inventors have found that a carbon-based solid acid has high catalytic activity and resists degradation of its catalytic activity even during repeated use when it is obtained by a method that includes a boron doping step including mixing a carbonaceous material precursor and a boron-containing compound; a carbonizing step including heating a boron-containing carbonaceous material precursor to carbonize at least part of the boron-containing carbonaceous material precursor, wherein the boron-containing carbonaceous material precursor is a product obtained through the boron doping step; and a sulfonic acid group introducing step including mixing a boron-containing carbonaceous material with at least one selected from the group consisting of concentrated sulfuric acid, fuming sulfuric acid, and sulfur trioxide, wherein the boron-containing carbonaceous material is a product obtained through the carbonizing step. The inventors have also found that the a carbon-based solid acid including a sulfonic acid group-bearing carbonaceous material has high catalytic activity and resists degradation of its catalytic activity even during repeated use when the carbonaceous material at least partially has a graphene structure and contains boron. The present invention has been accomplished by further studies based on these findings.

Specifically, the present invention provides the following modes.

Item 1. A carbon-based solid acid including a sulfonic acid group-bearing carbonaceous material,
   wherein the carbonaceous material at least partially has a graphene structure and contains boron.
Item 2. The carbon-based solid acid according to item 1, wherein the carbonaceous material is derived from at least one carbonaceous material precursor selected from the group consisting of a carbohydrate, an aromatic compound, and a resin.
Item 3. The carbon-based solid acid according to item 1 or 2, which has an acidity of 1.0 mmol/g or more as measured by titration.

Item 4. The carbon-based solid acid according to any one of items 1 to 3, which has a boron content in the range of 0.0001% by mass to 20% by mass.

Item 5. The carbon-based solid acid according to any one of items 1 to 4, further including a porous material on which the carbonaceous material is supported.

Item 6. A solid acid catalyst including the carbon-based solid acid according to any one of items 1 to 5.

Item 7. A method for producing a carbon-based solid acid, the method including:
 a boron doping step including mixing a carbonaceous material precursor and a boron-containing compound;
 a carbonizing step including heating a boron-containing carbonaceous material precursor to carbonize at least part of the boron-containing carbonaceous material precursor, wherein the boron-containing carbonaceous material precursor is a product obtained through the boron doping step; and
 a sulfonic acid group introducing step including mixing a boron-containing carbonaceous material with at least one selected from the group consisting of concentrated sulfuric acid, fuming sulfuric acid, and sulfur trioxide, wherein the boron-containing carbonaceous material is a product obtained through the carbonizing step.

Item 8. The method according to item 7, further including the step of depositing the boron-containing carbonaceous material precursor on a porous material after the boron doping step.

Advantages of the Invention

The present invention makes it possible to provide a novel carbon-based solid acid that has high catalytic activity and resists degradation of its catalytic activity even when used repeatedly. The present invention also makes it possible to provide a carbon-based solid acid catalyst including the carbon-based solid acid and to provide methods for producing them. The carbon-based solid acid catalyst can be used even in water and therefore can be advantageously used as an acid catalyst for chemical reactions that would otherwise be performed, for example, using sulfuric acid as an acid catalyst.

EMBODIMENTS OF THE INVENTION

The carbon-based solid acid of the present invention includes a sulfonic acid group-bearing carbonaceous material, wherein the carbonaceous material at least partially has a graphene structure and contains boron. The method of the present invention for producing a carbon-based solid acid includes a boron doping step including mixing a carbonaceous material precursor and a boron-containing compound; a carbonizing step including heating a boron-containing carbonaceous material precursor to carbonize at least part of the boron-containing carbonaceous material precursor, wherein the boron-containing carbonaceous material precursor is a product obtained through the boron doping step; and a sulfonic acid group introducing step including mixing a boron-containing carbonaceous material with at least one selected from the group consisting of concentrated sulfuric acid, fuming sulfuric acid, and sulfur trioxide, wherein the boron-containing carbonaceous material is a product obtained through the carbonizing step. Hereinafter, a detailed description will be given of the carbon-based solid acid of the present invention, a carbon-based solid acid catalyst including the carbon-based solid acid, and methods for producing them.

The carbon-based solid acid of the present invention includes a carbonaceous material having sulfonic acid groups and also at least partially having a graphene structure. As described below, the carbonaceous material in the carbon-based solid acid of the present invention may be a carbonaceous material having sulfonic acid groups, at least partially having a graphene structure, and containing boron, which can be produced, for example, by a process including doping a carbonaceous material precursor as a raw material with boron to form a boron-containing carbonaceous material precursor, then carbonizing the precursor into a boron-containing carbonaceous material at least partially having a graphene structure, and then introducing sulfonic acid groups into the carbonaceous material. On the other hand, as described below, substantially all boron atoms may be removed from the boron-containing carbonaceous material by cleaning or other processes after the introduction of sulfonic acid groups into the boron-containing carbonaceous material. In such a case, the carbon-based solid acid may include a carbonaceous material having sulfonic acid groups, at least partially having a graphene structure, and being substantially free of boron.

The carbonaceous material precursor as a raw material for the carbon-based solid acid of the present invention may be of any type capable of being doped with boron, capable of being converted at least partially into a graphene structure by heating, and capable of having sulfonic acid groups introduced into the formed graphene structure. The carbonaceous material precursor is preferably a carbohydrate, an aromatic compound, or a resin. Specifically, the carbonaceous material in the carbon-based solid acid of the present invention is preferably derived from a carbohydrate, an aromatic compound, a resin, or other carbonaceous material precursors. A single carbonaceous material precursor may be used alone, or two or more carbonaceous material precursors may be used in combination.

The carbohydrate is preferably, but not limited to, glucose, sucrose (sugar), maltose, fructose, lactose, fructooligosaccharide, galactooligosaccharide, mannan oligosaccharide, cellulose, starch, or amylose.

The aromatic compound is typically, but not limited to, a monocyclic aromatic compound or a polycyclic aromatic compound. The monocyclic aromatic compound is preferably benzene or a substituted benzene. The substituent of the substituted benzene may be, for example, alkyl of 1 to 4 carbon atoms, such as methyl, ethyl, propyl, or butyl; alkoxy of 1 to 4 carbon atoms, such as methoxy, ethoxy, propoxy, or butoxy; halogen such as fluorine, chlorine, bromine, or iodine; hydroxyl, amino, or vinyl. The polycyclic aromatic compound is preferably naphthalene, pyrene, benzo(a)pyrene, benzanthracene, anthracene, phenanthrene, coronene, kekulene, biphenyl, or terphenyl. The polycyclic aromatic compound may have a substituent. Examples of the substituent which the polycyclic aromatic compound may have include those listed above for the substituted benzene. These aromatic compounds are contained in tar or pitch. Therefore, tar or pitch may be used as the aromatic compound.

Examples of the resin include, but are not limited to, thermosetting resins such as phenolic resins, furan resins, urea resins, melamine resins, unsaturated polyester resins, and epoxy resins.

In a first mode of the carbon-based solid acid of the present invention, the carbonaceous material contains boron. In the first mode of the carbon-based solid acid of the present invention, the presence of boron in the carbonaceous material would make it possible to increase the amount of sulfonic acid groups in the carbon-based solid acid. The presence of boron in the carbonaceous material would also make it possible to produce a carbon-based solid acid that has high catalytic activity for acid catalyst-assisted chemical reactions and resists degradation of its catalytic activity even when used repeatedly. Although not clear in detail, the mechanism of how these advantageous effects are produced by the presence of boron in the carbonaceous material may be, for example, as follows. Boron, which is an element with low electronegativity, would function to donate electrons to carbon atoms in the carbonaceous material. If electrons are donated to carbon atoms, the bond between the sulfur atom of a sulfonic acid group and the carbon atom bonded thereto would be strengthened so that the sulfonic acid group can be stabilized. This would make it possible to produce a carbon-based solid acid that has sulfonic acid groups capable of effectively functioning as a catalyst and resists not only elimination of the sulfonic acid groups from the carbonaceous material but also degradation of its catalytic activity even when used repeatedly.

On the other hand, as described below, the carbon-based solid acid of the present invention can be produced by a method including a boron doping step including mixing a carbonaceous material precursor and a boron-containing compound; a carbonizing step including heating a boron-containing carbonaceous material precursor to carbonize at least part of the boron-containing carbonaceous material precursor, wherein the boron-containing carbonaceous material precursor is a product obtained through the boron doping step; and a sulfonic acid group introducing step including mixing a boron-containing carbonaceous material with at least one selected from the group consisting of concentrated sulfuric acid, fuming sulfuric acid, and sulfur trioxide, wherein the boron-containing carbonaceous material is a product obtained through the carbonizing step. In such a production process, a boron-containing carbonaceous material is produced, but the content of boron in the carbonaceous material can be reduced by the sulfonic acid group introducing step and by an optional cleaning step.

In a second mode of the carbon-based solid acid of the present invention, the carbonaceous material is substantially free of boron. The second mode of the carbon-based solid acid of the present invention is evaluated as having an extremely low boron content or being substantially free of boron. Even the second mode of the carbon-based solid acid can have high catalytic activity for acid catalyst-assisted chemical reactions and resist degradation of its catalytic activity even when used repeatedly, like the first mode. Although not clear in detail, the mechanism of it may be, for example, as follows. Even when boron is removed by a certain step after the boron-containing carbonaceous material precursor is produced in the carbonaceous material producing process, the space in which boron used to be present would be maintained as a reaction field. This would make it possible to produce a carbon-based solid acid that has sulfonic acid groups capable of effectively functioning as a catalyst in the reaction field and resists not only elimination of the sulfonic acid groups from the carbonaceous material but also degradation of its catalytic activity even when used repeatedly. In general, however, boron can remain in the carbonaceous material even when a cleaning step or the like is performed in the process of producing the carbon-based solid acid. Therefore, the carbon-based solid acid of the present invention generally contains boron as in the first mode.

The method of doping the carbonaceous material precursor as a raw material with boron is typically, but not limited to, a method of mixing the carbonaceous material precursor as a raw material with a boron-containing compound. The boron-containing compound may be any compound that enables the doping of the carbonaceous material precursor with boron. Preferably, the boron-containing compound is boric acid, phenylboronic acid, n-butylboronic acid, triphenylboroxine, trimethyl borate, ammonium borate, or the like. A single boron-containing compound may be used alone, or two or more boron-containing compounds may be used in combination. For example, when boric acid or the like is used as the boron-containing compound, the carbonaceous material precursor preferably has a hydroxyl group. This is because when the carbonaceous material precursor has a hydroxyl group, an ester bond can be formed between the hydroxyl group and the hydroxyl group of boric acid or the like by heating and dehydration, so that boron doping can be successfully performed. The carbonaceous material precursor and the boron-containing compound are preferably mixed under heating. The heating temperature is preferably, but not limited to, about 50° C. to about 180° C. The boron doping may also be performed under increased pressure. A solvent may also be used in the doping of the carbonaceous material precursor with boron. The solvent may be appropriately selected depending on the solubility of the carbonaceous material precursor and the boron-containing compound. The solvent may be, for example, water, ethanol, or the like.

The content of boron in the carbon-based solid acid of the present invention is preferably in the range of 0.0001% by mass to 20% by mass, more preferably in the range of 0.003% by mass to 20% by mass, even more preferably in the range of 0.005% by mass to 20% by mass. In the present invention, the content of boron in the carbon-based solid acid can be measured by elemental analysis or ICP emission spectroscopy. Alternatively, the carbon-based solid acid of the present invention obtained through the boron doping step and other steps may be substantially free of boron as in the second mode described above.

In the present invention, the carbonaceous material at least partially has a graphene structure. In the carbon-based solid acid of the present invention, the carbonaceous material at least partially has a graphene structure, to which acid groups such as sulfonic acid groups are strongly bonded. The method of forming a graphene structure in at least part of the carbonaceous material may be, for example, a method of heating the boron-containing carbonaceous material precursor to carbonize at least part of it (carbonization). The heating may be performed in the boron doping step. In this case, the carbonization may be performed simultaneously with the boron doping step.

The carbonization may be performed by, for example, heating the boron-containing carbonaceous material precursor in an inert gas atmosphere such as nitrogen or argon or in the atmosphere (air) or the like. The carbonization conditions may be appropriately selected depending on the type of the carbonaceous material precursor as a raw material and the desired properties of the carbon-based solid acid. The heating temperature is typically, but not limited to, 300° C. or higher, preferably 350° C. or higher, more preferably 400° C. or hither, in order to form the graphene structure effectively. If the heating temperature is too high, sulfonic acid groups may be difficult to introduce. Therefore, the upper limit of the heating temperature is generally about 600° C., preferably about 550° C. The heating time for the carbonization is typically, but not limited to, about 1 to about 100 hours, preferably about 2 to about 15 hours. When the boron-containing carbonaceous material precursor is carbonized in the air, acid groups such as carboxyl groups or hydroxyl groups can be introduced into the carbonaceous material. The introduction of carboxyl groups or the like can stabilize the sulfonic acid groups in the carbonaceous material, so that the resulting carbon-based solid acid can have higher catalytic activity and resist degradation of its catalytic activity even when used repeatedly. The sulfonic acid group-stabilizing effect of carboxyl groups or the like would be, for example, as follows. When carboxyl groups or the like are introduced into the carbonaceous material, the carboxyl groups or the like can ionize, for example, in water to supply electrons to the sulfonic acid groups, which would strengthen the bond between the sulfur atom of the sulfonic acid group and the carbon atom bonded thereto and thus stabilize the sulfonic acid group. This would make it possible to produce a carbon-based solid acid that has sulfonic acid groups capable of effectively functioning as a catalyst and resists not only elimination of the sulfonic acid groups from the carbonaceous material but also degradation of its catalytic activity even when used repeatedly.

In the carbon-based solid acid of the present invention, the carbonaceous material has sulfonic acid groups. As mentioned above, sulfonic acid groups may be introduced into, for example, the boron-containing carbonaceous material, which has been doped with boron and at least partially carbonized. The sulfonation method for introducing sulfonic acid groups into the boron-containing carbonaceous material is typically, but not limited to, a method of mixing the boron-containing carbonaceous material with at least one of concentrated sulfuric acid, fuming sulfuric acid, and sulfur trioxide. More specifically, the sulfonation method may be a method of mixing concentrated sulfuric acid or fuming sulfuric acid with the boron-containing carbonaceous material in the presence of an inert gas such as argon or nitrogen; or a method of bringing sulfur trioxide gas into contact with the boron-containing carbonaceous material in the presence of an inert gas such as argon or nitrogen.

When concentrated sulfuric acid or fuming sulfuric acid is used to introduce sulfonic acid groups, the amount of concentrated sulfuric acid or fuming sulfuric acid is typically, but not limited to, about 5 to about 1,000 parts by mass, preferably about 100 to about 500 parts by mass, based on 1 part by mass of the boron-containing carbonaceous material. When concentrated sulfuric acid or fuming sulfuric acid is used, the sulfonation temperature is typically about 20 to about 250° C., preferably about 50 to about 200° C. When concentrated sulfuric acid or fuming sulfuric acid is used, the sulfonation time is typically about 5 to about 150 minutes, preferably about 30 to about 120 minutes.

When sulfur trioxide gas is used to introduce sulfonic acid groups, the concentration of sulfur trioxide gas in the sulfonation is typically, but not limited to, about 5 to 100% by volume, preferably about 20 to about 50% by volume. When sulfur trioxide gas is used, the sulfonation temperature is typically, but not limited to, about 20 to about 250° C., preferably about 50 to about 200° C. When sulfur trioxide gas is used, the sulfonation time is typically about 5 to about 150 minutes, preferably about 30 to about 120 minutes.

After the sulfonation, excess concentrated sulfuric acid, fuming sulfuric acid, or sulfur trioxide is preferably removed by washing the sulfonated carbonaceous material with hot water or the like and drying it. The washing with hot water can be performed under reflux at about 100° C., for example, by a Soxhlet extracting method. The washing may also be performed under increased pressure, so that the washing time can be reduced.

The acidity of the carbon-based solid acid of the present invention is preferably, but not limited to, 1.0 mmol/g or more, more preferably 1.5 mmol/g or more, as measured by titration. If the acidity is less than 1.0 mmol/g, the carbon-based solid acid may have insufficient activity when used as an acid catalyst for chemical reactions. In the present invention, the acidity measured by titration is the value determined by a measurement process that includes immersing the carbon-based solid acid in an appropriate amount of water and then subjecting the immersed carbon-based solid acid to simple titration using an aqueous 0.1 N or 0.01 N NaOH solution or to back titration using an aqueous 0.1 N or 0.01 N NaOH solution and an aqueous 0.1 N or 0.01 N HCl solution. Simple titration can be easily performed and therefore is a method suitable for preliminary measurement of the acidity of the carbon-based solid acid. Back titration is a method suitable for more precise measurement of the acidity of the carbon-based solid acid. The acidity of the carbon-based solid acid of the present invention refers to the acidity measured by the back titration. Besides sulfonic acid groups, the carbon-based solid acid of the present invention may also contain other acid groups such as carboxyl and hydroxyl groups. In such a case, the acidity in the present invention is the total acidity derived from sulfonic acid groups and other acid groups.

The carbon-based solid acid of the present invention includes the carbonaceous material that is obtained through the boron doping step, at least partially has a graphene structure, and also has the introduced sulfonic acid groups. The carbon-based solid acid of the present invention may be made of the carbonaceous material or may be a composite of a porous material or the like and the carbonaceous material supported thereon. When the carbon-based solid acid of the present invention is made of the carbonaceous material, the carbonaceous material having the introduced sulfonic acid groups is generally in the form of a power. If necessary, the powder may be formed into granules, a plate, or pellets.

When the carbon-based solid acid is a composite of a porous material and the carbonaceous material supported thereon, the porous material is typically, but not limited to, an inorganic porous material such as activated carbon, alumina, silica, titania, magnesia, zirconia, carbon nanotubes, carbon nanohorns (e.g., spherical or dahlia-like carbon nanohorns), carbon nanofibers, or fullerenes. Among them, preferred are activated carbon, carbon nanotubes, and carbon nanohorns. Examples of activated carbon include fibrous activated carbon, granulated activated carbon, powdered activated carbon, crushed activated carbon, cylindrical activated carbon, and honeycomb activated carbon. Among them, fibrous activated carbon is preferred. Fibrous activated carbon is preferably subjected to activation with an aqueous potassium hydroxide solution or the like before use. A single porous material may be used alone, or two or more porous materials may be used in combination.

In the present invention, the fibrous activated carbon refers to porous fibrous activated carbon as defined in, for example, JIS K 1477. In the present invention, the fiber diameter of the fibrous activated carbon is preferably, but not limited to, about 1 to about 30 μm. The average fiber length of the fibrous activated carbon is preferably, but not limited to, 0.1 mm or more. The average fiber length of the fibrous activated carbon is the value determined by the method provided in JIS K 1477. The specific surface area of the fibrous activated carbon is preferably, but not limited to, about 500 to about 2,000 $m^2/g$. The specific surface area of the fibrous activated carbon is the value determined by the BET method provided in JIS K 1477. When the carbon-based solid acid of the present invention is a composite of the carbonaceous material and the fibrous activated carbon, the handleability of the solid acid being used as a catalyst as described below (such as the degree of easiness of separating, recovering, purifying, or recycling the solid acid catalyst from the product after the reaction) can be much higher than that, for example, in a case where a powdery or granular inorganic porous material is used. When the fibrous activated carbon is used, the solid acid catalyst can also be advantageously used, for example, in the form of a filter.

When the carbon-based solid acid of the present invention is a composite of the porous material and the carbonaceous material supported thereon, the content of the carbonaceous material is typically about 0.01 to about 50 parts by mass, preferably about 0.1 to about 20 parts by mass, based on 100 parts by mass of the porous material.

The method of depositing the carbonaceous material on the porous material is typically, but not limited to, a method that includes immersing the porous material in a solution of the boron-containing carbonaceous material precursor, then drying the porous material, and then carbonizing and sulfonating the precursor on the porous material. The solvent for dissolving the boron-containing carbonaceous material precursor may be, for example, water, ethanol, or the like.

The carbon-based solid acid of the present invention has high catalytic activity for acid catalyst-assisted chemical reactions and resists degradation of its catalytic activity even when used repeatedly. Therefore, the carbon-based solid acid of the present invention can be advantageously used as a solid acid catalyst. Specifically, the carbon-based solid acid of the present invention can function as a catalyst even in water and therefore can be advantageously used as a solid acid catalyst alternative to, for example, a sulfuric acid catalyst.

The carbon-based solid acid of the present invention as a solid acid catalyst can catalyze chemical reactions that would, for example, otherwise be performed using known acid catalysts. Such chemical reactions include, for example, esterification, hydrolysis, alkylation, dehydration condensation of alcohols, and hydration of olefins. In addition, the carbon-based solid acid of the present invention can advantageously function as a solid acid catalyst, for example, at 100° C. or higher and even at a high temperature of 150° C. or higher. For example, as shown in Example 14 described below, therefore, the carbon-based solid acid of the present invention can also be advantageously used for hydrolysis of cellulose, which is generally resistant to decomposition reactions.

The carbon-based solid acid of the present invention can be produced, for example, as follows. First, a boron doping step is performed, which includes mixing the carbonaceous material precursor and the boron-containing compound as raw materials. The method of mixing the carbonaceous material precursor and the boron-containing compound may be as described above. Next, a carbonizing step is performed, which includes heating a boron-containing carbonaceous material precursor to carbonize at least part of the boron-containing carbonaceous material precursor, wherein the boron-containing carbonaceous material precursor is a product obtained through the boron doping step. The carbonizing step may be the carbonization described above. Next, a sulfonic acid group introducing step is performed, which includes mixing a boron-containing carbonaceous material with at least one selected from the group consisting of concentrated sulfuric acid, fuming sulfuric acid, and sulfur trioxide, wherein the boron-containing carbonaceous material is a product obtained through the carbonizing step. The sulfonic acid group introducing step may also be the sulfonation described above.

The carbon-based solid acid of the present invention may be produced as a composite of a porous material and the carbonaceous material supported thereon. In this case, the boron doping step may be followed by the step of depositing the boron-containing carbonaceous material precursor on the porous material. The method of depositing the boron-containing carbonaceous material precursor on the porous material may be as described above.

The carbon-based solid acid produced by the method of the present invention may be the first mode, which contains boron, or the second mode, which is free of boron. Both the first and second modes of the carbon-based solid acid of the present invention have high catalytic activity and resist degradation of their catalytic activity even when used repeatedly, because the carbon-based solid acid of the present invention is produced by introducing sulfonic acid groups into the boron-containing carbonaceous material obtained through the boron doping step and the carbonizing step.

EXAMPLES

Hereinafter, the present invention will be more specifically described with reference to examples and comparative examples. It will be understood that such examples are not intended to limit the present invention.

Example 1

Glucose (1.40 g) and boric acid (1.00 g) were dissolved in water to form about 35 ml of an aqueous solution. The resulting aqueous solution was placed in an autoclave vessel (50 ml) and then heated in a furnace at 120° C. for 12 hours. Subsequently, the aqueous solution was taken out of the autoclave vessel and then heated on a hot plate at 120° C. until a gluey liquid was obtained. Using a tube furnace, the product was further heated at 400° C. for 2 hours in an argon stream (heated over 1 hour and then kept at 400° C. for 2 hours) to form a solid having a graphene structure. Subsequently, the resulting solid was washed twice with hot water at about 100° C. and then ground in an agate mortar into a powder. The resulting powder was then immersed in 30% fuming sulfuric acid (25 ml) in a round bottom flask. The flask was set in a mantle heater, which was set at a temperature of 150° C., and the fuming sulfuric acid was refluxed for 1 hour, so that sulfonic acid groups were introduced into the powder. Subsequently, the powder was taken out, then rinsed many times with pure water, and then boiled in water at 80 to 100° C. for 1 hour. Subsequently, the powder was taken out and then dried at 50° C. for 1 hour to give a carbon-based solid acid. The resulting carbon-based solid acid was immersed in 30 ml of water and then measured for acidity by back titration using an aqueous 0.1 N NaOH solution and an aqueous 0.01 N HCl solution. As a result, the carbon-based solid acid had an acidity of 4.2 mmol/g. The carbon-based solid acid prepared as in Example 1 was pretreated by microwave acid digestion and then measured for boron content by ICP emission spectrometry. As a result, the carbon-based solid acid had a boron content of 0.004% by mass.

Example 2

A carbon-based solid acid was obtained as in Example 1. The acidity of the carbon-based solid acid was then measured as in Example 1. As a result, the acidity was 4.3 mmol/g with good reproducibility.

Example 3

A carbon-based solid acid was obtained as in Example 1, except that the temperature of the autoclave was set at 140° C. The acidity of the carbon-based solid acid was measured as in Example 1. As a result, the acidity was 4.2 mmol/g.

Example 4

A carbon-based solid acid was obtained as in Example 1, except that sulfonic acid groups were introduced, as described below using sulfur trioxide, into the powder obtained by grinding. To a round bottom flask was added 23 ml of 30% fuming sulfuric acid, and a glass jig with an opening facing the inside of the flask was inserted into one of the necks of the flask. The powder (0.25 g) was placed in the glass jig. The round bottom flask was then heated in a mantle heater at 150° C. for 1 hour (in which sulfur trioxide gas was produced by heating the fuming sulfuric acid). The powder was taken out of the glass jig and then washed, boiled, and dried as in Example 1 to give the carbon-based solid acid. The acidity of the carbon-based solid acid was measured as in Example 1. As a result, the acidity was 4.2 mmol/g.

Comparative Example 1

A carbon-based solid acid was obtained as in Example 1, except that no boric acid was added. The acidity of the carbon-based solid acid was measured as in Example 1. As a result, the acidity was 1.4 mmol/g.
[Esterification of Acetic Acid and Ethanol]
Esterification of acetic acid and ethanol was performed as described below using each of the carbon-based solid acids obtained in Example 1 and Comparative Example 1. A mixture was obtained by adding 0.1 mol of acetic acid and 1.0 mol of ethanol to a 100 mL round bottom flask. About 50 mg of the carbon-based solid acid catalyst obtained in each of Examples 1 to 4 and Comparative Example 1 was then added to the flask and stirred at a temperature of 80° C. for 2 hours to cause esterification. The yield of the esterification was determined by gas chromatography. The esterification was performed twice in the same manner with respect to each of Examples 1 to 4 and Comparative Example 1. Table 1 shows the results on the esterification yield and the esterification yield retention (defined as [the second yield]/[the first yield]×100(%)).
[Measurement of Cellobiose Hydrolysis Rate]
The rate (µmol/h/g) of hydrolysis of cellobiose was measured as described below using, as a catalyst, each of the carbon-based solid acids obtained in Examples 1 to 4 and Comparative Example 1. Water (3 ml), the carbon-based solid acid obtained in each of Examples 1 to 4 and Comparative Example 1 (each weight is indicated in the parentheses [ ] in Table 1), cellobiose (15 mg), and a stirring bar were added to a screw cap test tube (Maruemu NR-10). The test tube was then tightly capped. The materials in the test tube were allowed to react by heating and stirring with a heat-resistant magnetic stirrer placed in a thermostatic chamber kept at 100° C. After a lapse of 45 minutes, the test tube was taken out of the thermostatic chamber, and part (0.3 mL) of the reaction liquid was sampled. The test tube was then returned to the thermostatic chamber, and the reaction was further performed for 45 minutes, at which the first reaction was completed. The amounts of glucose in the reaction liquids sampled at 45 and 90 minutes, respectively, were determined using RQ Flex Instrument manufactured by Merck and glucose test strips (16720-1M) for the instrument. The reaction time (45 minutes (namely 0.75 hours) and 90 minutes (namely 1.5 hours) was plotted on the horizontal axis of the graph, and each produced amount (µmol) of glucose was plotted on the vertical axis. The slope passing through the origin was determined by least squares method. The rate (µmol/h/g) of glucose production was determined by dividing the resulting value by the amount of the catalyst. After the reaction, the carbon-based solid acid was recovered by filtration and then cleaned by being rinsed three times in ion-exchanged water. Subsequently, the carbon-based solid acid was dried at room temperature and then used in the second reaction. The reaction was then repeated in the same manner, in which the rate of cellobiose hydrolysis with the carbon-based solid acid obtained in each of Examples 1 to 4 and Comparative Example 1 was measured three times. Table 1 shows the results of the measurement of the cellobiose hydrolysis rate and the cellobiose hydrolysis rate retention (defined as [the third yield]/[the first yield]×100(%)).

TABLE 1

| | Carbonaceous material precursor | Autoclaving temperature | Means for introducing sulfonic acid groups | Titer (mmol/g) | Catalyst amount and esterification yield (%) | | | Esterification yield retention (%) | Cellobiose hydrolysis rate (µmol/h/g) (catalyst weight (mg) in [ ]) | | | Cellobiose hydrolysis rate retention (%) |
|---|---|---|---|---|---|---|---|---|---|---|---|---|
| | | | | | Catalyst amount (mg) | First | Second | | First | Second | Third | |
| Example 1 | Glucose + boric acid | 120° C. | Fuming sulfuric acid | 4.2 | 57 | 42.1 | 44.3 | 105 | 147 [51] | 111 [49] | 107 [43] | 73 |
| Example 2 | Glucose + boric acid | 120° C. | Fuming sulfuric acid | 4.3 | — | — | — | — | 132 [68] | 123 [62] | 152 [54] | 115 |
| Example 3 | Glucose + boric acid | 140° C. | Fuming sulfuric acid | 4.2 | — | — | — | — | 119 [48] | 125 [44] | 98 [38] | 82 |

TABLE 1-continued

| | Carbonaceous material precursor | Autoclaving temperature | Means for introducing sulfonic acid groups | Titer (mmol/g) | Catalyst amount and esterification yield (%) | | | Esterification yield retention (%) | Cellobiose hydrolysis rate (μmol/h/g) (catalyst weight (mg) in [ ]) | | | Cellobiose hydrolysis rate retention (%) |
|---|---|---|---|---|---|---|---|---|---|---|---|---|
| | | | | | Catalyst amount (mg) | First | Second | | First | Second | Third | |
| Example 4 | Glucose + boric acid | 120° C. | Sulfur trioxide | 4.2 | — | — | — | — | 111 [68] | 98 [62] | 111 [54] | 100 |
| Comparative Example 1 | Glucose | 120° C. | Fuming sulfuric acid | 1.4 | 68 | 19.2 | 14.6 | 76 | 28.9 [64] | 16.2 [60] | 11.8 [56] | 41 |

As shown in Table 1, it has been found that the carbon-based solid acids of Examples 1 to 4, produced through the doping of glucose with boron, have a relatively high sulfonic acid group content. It has also been found that the carbon-based solid acid of Example 1 provides a high esterification yield and a high cellobiose hydrolysis rate and has high catalytic activity. It has also been found that the carbon-based solid acid of Example 1 provides a high esterification yield retention and a high cellobiose hydrolysis rate retention and can be repeatedly used as an acid catalyst. It has also been found that the carbon-based solid acids of Examples 2 to 4, also produced through the doping of glucose with boron, provide a high cellobiose hydrolysis rate and have high catalytic activity. It has further been found that the carbon-based solid acids of Examples 2 to 4 also provide a high cellobiose hydrolysis rate retention and can be repeatedly used as an acid catalyst. In contrast, the sulfonic acid group content of the carbon-based solid acid of Comparative example 1, in which glucose is not doped with boron, is lower than that of the carbon-based solid acids of Examples 1 to 4. The carbon-based solid acid of Comparative Example 1 also provides a low esterification yield, a low cellobiose hydrolysis rate, a low esterification yield retention, and a low cellobiose hydrolysis rate retention.

Example 5

Glucose (1.40 g) and boric acid (1.00 g) were dissolved in water to form about 35 ml of an aqueous solution. The resulting aqueous solution was placed in an autoclave vessel (50 ml) and then heated in a furnace at 120° C. for 12 hours. Subsequently, about half of the amount of water was removed from the aqueous solution using a hot plate so that the concentrations of glucose and boric acid were doubled. Subsequently, a 1×3 cm cut piece of felt-like fibrous activated carbon (K-Filter KF-1000F (trade name) manufactured by Toyobo Co., Ltd.) was immersed in the concentrated aqueous solution and then taken out and dried. Subsequently, the dried fibrous activated carbon was heated in an argon stream at 400° C. for 2 hours using a tube furnace (heated over 1 hour and then kept at 400° C. for 2 hours) and then washed twice with hot water at about 100° C. Before immersed in the concentrated aqueous solution, the fibrous activated carbon was dried by being heated in the air at 120° C. for 1 hour and then cooled at room temperature for 30 seconds. The fibrous activated carbon was then immersed in 30% fuming sulfuric acid (25 ml) in a round bottom flask. The flask was set in a mantle heater, which was set at a temperature of 150° C., and the fuming sulfuric acid was refluxed for 1 hour, so that sulfonic acid groups were introduced into the fibrous activated carbon. Subsequently, the fibrous activated carbon was taken out, then rinsed many times with pure water, and then boiled in water at 80 to 100° C. for 1 hour. Subsequently, the fibrous activated carbon was taken out and then dried at 50° C. for 1 hour to give a carbon-based solid acid. The acidity of the resulting carbon-based solid acid was measured as in Example 1. As a result, the acidity of the carbon-based solid acid was 2.0 mmol/g. The esterification yield and the esterification yield retention were also measured as in Example 1. Table 2 shows the results.

TABLE 2

| | Concentration for immersion of fibrous activated carbon | Presence or absence of boron doping | Titer (mmol/g) | Catalyst amount and esterification yield (%) | | | Esterification yield retention (%) |
|---|---|---|---|---|---|---|---|
| | | | | Catalyst amount (mg) | First | Second | |
| Example 5 | 2x concentrated | Present | 2.0 | 71 | 33.2 | 24.3 | 73 |

Table 2 shows that the carbon-based solid acid of Example 5, produced through the doping of glucose with boron and the deposition on the fibrous activated carbon, also has a relatively high sulfonic acid group content. It has also been found that the carbon-based solid acid of Example 5 provides a high esterification yield and has high catalytic activity. It has also been found that the carbon-based solid acid of Example 5 provides a high esterification yield retention and can be repeatedly used as an acid catalyst.

Example 6

A carbon-based solid acid was obtained as in Example 5, except that water was added to reduce the concentration to 1/3 instead of doubling the concentrations of glucose and boron. The acidity of the carbon-based solid acid was measured as in Example 1. As a result, the acidity was 1.2 mmol/g. The esterification yield and the esterification yield retention were also measured as in Example 1. Table 3 shows the results.

TABLE 3

| | Concentration for immersion of fibrous activated carbon | Presence or absence of boron doping | Titer (mmol/g) | Catalyst amount and esterification yield (%) | | | Esterification yield retention (%) |
|---|---|---|---|---|---|---|---|
| | | | | Catalyst amount (mg) | First | Second | |
| Example 6 | 1/3 diluted | Present | 1.2 | 62 | 15.5 | 15.6 | 101 |

As shown in Table 3, it has been found that the carbon-based solid acid of Example 6, produced through the immersion of the fibrous activated carbon in a solution with glucose and boron concentrations diluted to 1/3, has a relatively low sulfonic acid group content and provides a relatively low esterification yield depending on the concentration, but provides a high esterification yield retention and can be repeatedly used as an acid catalyst.

Example 7

A carbon-based solid acid was obtained as in Example 5, except that the concentrations of glucose and boron were maintained instead of doubling them and the fibrous activated carbon was heated in the air at 400° C. instead of being heated in an argon stream at 400° C. The acidity of the carbon-based solid acid was measured as in Example 1. As a result, the acidity was 2.1 mmol/g. The esterification yield and the esterification yield retention were also measured as in Example 1. Table 4 shows the results.

TABLE 4

| | Heating of fibrous activated carbon | Presence or absence of boron doping | Titer (mmol/g) | Catalyst amount and esterification yield (%) | | | Esterification yield retention (%) |
|---|---|---|---|---|---|---|---|
| | | | | Catalyst amount (mg) | First | Second | |
| Example 7 | 400° C. in the air | Present | 2.1 | 66 | 20.7 | 16.7 | 81 |

Table 4 shows that the carbon-based solid acid of Example 7, produced through the heating of the fibrous activated carbon in the air, provides a high esterification yield. It has also been found that the carbon-based solid acid of Example 7 provides a high esterification yield retention and can be repeatedly used as an acid catalyst.

Example 8

In 100 ml of water was dispersed 15 mg of spherical carbon nanohorns (CNHs) (Spherical-Powder (product name) manufactured by Environment Energy Nanotechnology Research Institute Co., Ltd.), then sonicated twice for 15 minutes, and then filtered through a 1 µm membrane filter. Glucose (1.40 g) and boric acid (1.00 g) were then dissolved in the filtrate to form about 35 ml of a solution. The solution was placed in an autoclave vessel, then heated in a furnace at 120° C. for 12 hours, and then heated on a hot plate at 120° C. until a gluey liquid was obtained. The product was further treated in an argon stream at 400° C. (heated over 1 hour and then kept at 400° C. for 2 hours). The resulting sample was washed twice with hot water at about 100° C. The sample was then immersed in 30% fuming sulfuric acid (25 ml) in a round bottom flask. The flask was set in a mantle heater, which was set at a temperature of 150° C., and the fuming sulfuric acid was refluxed for 1 hour, so that sulfonic acid groups were introduced into the sample. Subsequently, the sample was taken out, then rinsed many times with pure water, and then boiled in water at 80 to 100° C. for 1 hour. The sample was then dried at 50° C. for 1 hour to give a carbon-based solid acid. The acidity of the resulting carbon-based solid acid was measured as in Example 1. The esterification yield, the esterification yield retention, the cellobiose hydrolysis yield, and the cellobiose hydrolysis yield retention were also measured as in Example 1. Table 5 shows the results.

Comparative Example 2

A carbon-based solid acid was obtained as in Example 8, except that boric acid (1.00 g) was not added. The acidity of the resulting carbon-based solid acid was measured as in Example 1. The esterification yield, the esterification yield retention, the cellobiose hydrolysis yield, and the cellobiose hydrolysis yield retention were also measured as in Example 1. Table 5 shows the results.

TABLE 5

| | | Catalyst amount and esterification yield (%) | | | | Cellobiose hydrolysis rate (µmol/h/g) (catalyst weight (mg) in [ ]) | | | |
|---|---|---|---|---|---|---|---|---|---|
| | Acidity (mmol/g) | Catalyst amount (mg) | First | Second | Retention (%) | First | Second | Third | Retention (%) |
| Example 8 | 3.5 | 104 | 53.2 | 46.6 | 88 | 121 [63] | 104 [55] | 92.2 [49] | 76 |

TABLE 5-continued

| | | Catalyst amount and esterification yield (%) | | | | Cellobiose hydrolysis rate (μmol/h/g) (catalyst weight (mg) in [ ]) | | | |
|---|---|---|---|---|---|---|---|---|---|
| | Acidity (mmol/g) | Catalyst amount (mg) | First | Second | Retention (%) | First | Second | Third | Retention (%) |
| Comparative Example 2 | 2.1 | 60 | 28.3 | 22.4 | 79 | 56.4 [61] | 53 [54] | 41.4 [47] | 73 |

As shown in Table 5, it has been found that the product of Example 8, produced using spherical carbon nanohorns as a carrier, has a high acidity, provides a high esterification yield retention and a high cellobiose hydrolysis rate retention, and can be repeatedly used as an acid catalyst. In contrast, the product of Comparative Example 2, produced without the addition of boron, has a sulfonic acid group content lower than that of the carbon-based solid acid of Example 8. The carbon-based solid acid of Comparative Example 2 provides a low cellobiose hydrolysis rate, a low esterification yield retention, and a low cellobiose hydrolysis rate retention.

Example 9

A carbon-based solid acid was obtained as in Example 8, except that dahlia-like carbon nanohorns (CNHs) (Dahlia-Like-Powder (product name) manufactured by Environment Energy Nanotechnology Research Institute Co., Ltd.) were used instead of spherical carbon nanohorns. The acidity of the resulting carbon-based solid acid was measured as in Example 1. The esterification yield, the esterification yield retention, the cellobiose hydrolysis yield, and the cellobiose hydrolysis yield retention were also measured as in Example 1. Table 6 shows the results.

Comparative Example 3

A carbon-based solid acid was obtained as in Example 9, except that boric acid (1.00 g) was not added. The acidity of the resulting carbon-based solid acid was measured as in Example 1. The esterification yield, the esterification yield retention, the cellobiose hydrolysis yield, and the cellobiose hydrolysis yield retention were also measured as in Example 1. Table 6 shows the results.

of boron, has a sulfonic acid group content lower than that of the carbon-based solid acid of Example 9. The carbon-based solid acid of Comparative Example 3 provides a low cellobiose hydrolysis rate, a low esterification yield retention, and a low cellobiose hydrolysis rate retention.

Example 10

Phenolic resin (Product ID: GA1364 manufactured by DIC Corporation) (2.00 g) was mixed with ammonium borate (2.00 g). Subsequently, the mixture was placed in an autoclave vessel (50 ml) and then heated in a furnace at 120° C. for 12 hours. Subsequently, the sample was taken out of the autoclave vessel and then transferred to a porcelain boat. The boat was then placed in a tubular furnace set at 120° C. and then heated in the air for 1 hour. The sample in the boat was further heated in the air for 1 hour in the tubular furnace heated at 400° C. Subsequently, the sample was ground in an agate mortar into a powder, which was washed twice with hot water at about 100° C. The resulting sample was immersed in 30% fuming sulfuric acid (25 ml) in a round bottom flask. The flask was set in a mantle heater, which was set at a temperature of 150° C., and the fuming sulfuric acid was refluxed for 1 hour, so that sulfonic acid groups were introduced into the sample. Subsequently, the sample was taken out, then rinsed many times with pure water, and then boiled in water at 80 to 100° C. for 1 hour. The sample was then dried at 50° C. for 1 hour to give a carbon-based solid acid. The acidity of the resulting carbon-based solid acid was measured as in Example 1. The esterification yield, the esterification yield retention, the cellobiose hydrolysis yield, and the cellobiose hydrolysis yield retention were also measured as in Example 1. Table 7 shows the results.

Comparative Example 4

A carbon-based solid acid was obtained as in Example 10, except that ammonium borate was not added and the auto-

TABLE 6

| | | Catalyst amount and esterification yield (%) | | | | Cellobiose hydrolysis rate (μmol/h/g) (catalyst weight (mg) in [ ]) | | | |
|---|---|---|---|---|---|---|---|---|---|
| | Acidity (mmol/g) | Catalyst amount (mg) | First | Second | Retention (%) | First | Second | Third | Retention (%) |
| Example 9 | 4.0 | 97 | 48.2 | 44.4 | 92 | 108 [65] | 85.1 [56] | 79.8 [51] | 74 |
| Comparative Example 3 | 2.3 | 68 | 32.3 | 24.3 | 75 | 66.2 [62] | 62 [54] | 45.8 [48] | 69 |

As shown in Table 6, it has been found that the product of Example 9, produced using dahlia-like carbon nanohorns as a carrier, also provides a high esterification yield retention and a high cellobiose hydrolysis rate retention and can be repeatedly used as an acid catalyst. In contrast, the product of Comparative Example 3, produced without the addition claving was not performed. The acidity of the resulting carbon-based solid acid was measured as in Example 1. The esterification yield, the esterification yield retention, the cellobiose hydrolysis yield, and the cellobiose hydrolysis yield retention were also measured as in Example 1. Table 7 shows the results.

TABLE 7

| | Acidity (mmol/g) | Catalyst amount and esterification yield (%) | | | | Cellobiose hydrolysis rate (μmol/h/g) (catalyst weight (mg) in [ ]) | | | |
| --- | --- | --- | --- | --- | --- | --- | --- | --- | --- |
| | | Catalyst amount (mg) | First | Second | Retention (%) | First | Second | Third | Retention (%) |
| Example 10 | 2.8 | 116 | 48.7 | 47.8 | 98 | 66 | 89.2 | 66 | 100 |
| Comparative Example 4 | 3.0 | 115 | 45.5 | 35 | 77 | 37.9 | 32.7 | 28.4 | 75 |

As shown in Table 7, it has been found that the product of Example 10, produced using phenolic resin as a carbonaceous material precursor, also provides a high esterification yield retention and a high cellobiose hydrolysis rate retention and can be repeatedly used as an acid catalyst. In contrast, the product of Comparative Example 4, produced without the addition of boron and without the autoclaving, has a sulfonic acid group content higher than that of the carbon-based solid acid of Example 10, but provides a low esterification yield, a low cellobiose hydrolysis rate, a low esterification yield retention, and a low cellobiose hydrolysis rate retention.

Example 11

Glucose (1.40 g) and boric acid (1.00 g) were dissolved in water to form about 35 ml of an aqueous solution. The solution was placed in an autoclave vessel (50 ml) and then heated in a furnace at 120° C. for 12 hours, so that an autoclaved solution was obtained in advance. On the other hand, 90.4 mg of K-Filter and KOH pellets (424 mg) were added to a nickel crucible and then treated in an argon stream at 700° C. for 2 hours. Subsequently, K-Filter was taken out and then thoroughly washed with pure water. This treatment reduced the weight of the K-Filter to 43.7 mg. Subsequently, the K-Filter was heated in the air at 120° C. for 1 hour and then immersed in the autoclaved solution before it was completely cooled to room temperature. Subsequently, the sample was taken out and dried, then treated in an argon stream at 400° C. (heated over 1 hour and kept at 400° C. for 2 hours), and then washed twice with hot water at about 100° C. The sample was then immersed in 30% fuming sulfuric acid (25 ml) in a round bottom flask. The flask was set in a mantle heater, which was set at a temperature of 150° C., and the fuming sulfuric acid was refluxed for 1 hour, so that sulfonic acid groups were introduced into the sample. Subsequently, the sample was taken out, then rinsed many times with pure water, and then boiled in water at 80 to 100° C. for 1 hour. The sample was then dried at 50° C. for 1 hour to give a carbon-based solid acid. The acidity of the resulting carbon-based solid acid was measured as in Example 1. The cellobiose hydrolysis yield and the cellobiose hydrolysis yield retention were also measured as in Example 1. Table 8 shows the results.

Example 12

A carbon-based solid acid was obtained as in Example 11, except that 514 mg of KOH was used in the KOH treatment of the K-Filter (94.0 mg) and the K-Filter used had a reduced weight of 34.2 mg. The acidity of the resulting carbon-based solid acid was measured as in Example 1. The cellobiose hydrolysis yield and the cellobiose hydrolysis yield retention were also measured as in Example 1. Table 8 shows the results.

Comparative Example 5

A carbon-based solid acid was obtained as in Example 11, except that KOH pellets (486 mg) were used in the KOH treatment of the K-Filter (99.2 mg), the K-Filter used had a reduced weight of 53.0 mg, and the K-Filter was not immersed in the autoclaved solution. The acidity of the resulting carbon-based solid acid was measured as in Example 1. The cellobiose hydrolysis yield and the cellobiose hydrolysis yield retention were also measured as in Example 1. Table 8 shows the results.

Comparative Example 6

A carbon-based solid acid was obtained as in Example 11, except that KOH pellets (498 mg) were used in the KOH treatment of the K-Filter (75.0 mg), the K-Filter used had a reduced weight of 29.1 mg, and the K-Filter was not immersed in the autoclaved solution. The acidity of the resulting carbon-based solid acid was measured as in Example 1. The cellobiose hydrolysis yield and the cellobiose hydrolysis yield retention were also measured as in Example 1. Table 8 shows the results.

TABLE 8

| | Acidity (mmol/g) | Cellobiose hydrolysis rate (μmol/h/g) (catalyst weight (mg) in [ ]) | | | |
| --- | --- | --- | --- | --- | --- |
| | | First | Second | Third | Retention (%) |
| Example 11 | 1.1 | 66.8 [11] | 46.7 [13] | 48 [11] | 72 |
| Example 12 | 1.8 | 81.4 [12] | 55.1 [15] | 53.6 [12] | 66 |
| Comparative Example 5 | 0.2 | — | — | — | — |
| Comparative Example 6 | 0.2 | 25.7 [17] | 16.9 [21] | 17.9 [20] | 70 |

As shown in Table 8, it has been found that the products of Examples 11 and 12, produced using K-Filter activated with an aqueous potassium hydroxide solution, provides a high cellobiose hydrolysis rate retention and can be repeatedly used as an acid catalyst. In contrast, the products of Comparative Examples 5 and 6, produced without the addition of boron, has a sulfonic acid group content lower than that of the carbon-based solid acids of Examples 11 and 12, and the product of Comparative Example 6 also provides a low cellobiose hydrolysis rate and a low cellobiose hydrolysis rate retention.

Example 13

Cellobiose hydrolysis was performed as in Example 2 using carbon-based solid acid obtained in Example 2, except that the reaction conditions included 150° C. instead of 100°

C. In order to increase the temperature, a pressure-resistant test tube (manufactured by Ace Glass, Inc.) was used as a reaction vessel instead of the screw cap test tube from Maruemu Corporation. In Example 13, stirring was not performed because the heat-resistant magnetic stirrer had an upper limit operation temperature of 110° C. It was confirmed by separately performing the reaction at 100° C. that the presence or absence of stirring did not produce a significant difference in reaction rate because cellobiose is completely soluble in water. The reaction was repeated four times, and the cellobiose hydrolysis rate retention was defined as [the fourth yield]/[the first yield]×100(%). Table 9 shows the results.

TABLE 9

| | Acidity (mmol/g) | Cellobiose hydrolysis rate (μmol/h/g) (catalyst weight (mg) in [ ]) | | | | Retention (%) |
|---|---|---|---|---|---|---|
| | | First | Second | Third | Fourth | |
| Example 13 | 4.3 | 2647 [22] | 2386 [20] | 2145 [18] | 2194 [17] | 83 |

Table 9 shows that in Example 13, a very high reaction rate was obtained by increasing the cellobiose reaction temperature to 150° C. It has also been found that the carbon-based solid acid provides a high hydrolysis rate retention and can be repeatedly used as an acid catalyst.

Comparative Example 7

Figure 1:
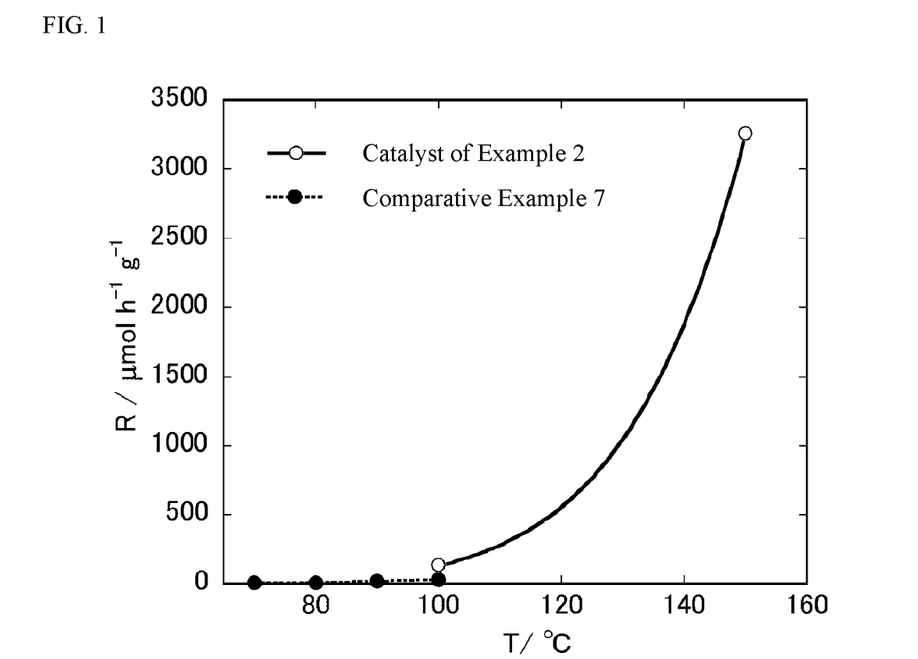
FIG. 1 is a graph showing plots of reaction rate (R/μmol $h^{-1}$ $g^{-1}$) against reaction temperature (T/° C.) obtained from the results in Comparative Example 7 and the results of a first reaction at 100° C. and 150° C. performed using a carbon-based solid acid obtained in Example 2.

Cellobiose hydrolysis was performed using a commercially available acid catalyst Amberlyst 15 (MP Biomedicals). The commercially available reagent, which contained a large amount of water, was dried in a furnace at 40° C. for 7 hours and then used for the reaction. Cellobiose hydrolysis was performed as described above in the section [Measurement of cellobiose hydrolysis rate], except that the reaction was performed with the fresh catalyst at each of the reaction temperatures 70° C., 80° C., 90° C., and 100° C. without being repeated. FIG. 1 shows plots of reaction rate (R/μmol h$^{-1}$ g$^{-}$) against reaction temperature (T/° C.) obtained from the results in Comparative Example 7 and the results of the first reaction at 100° C. (Table 1) and 150° C. (Table 9) performed using the carbon-based solid acid obtained in Example 2.

Figure 2:
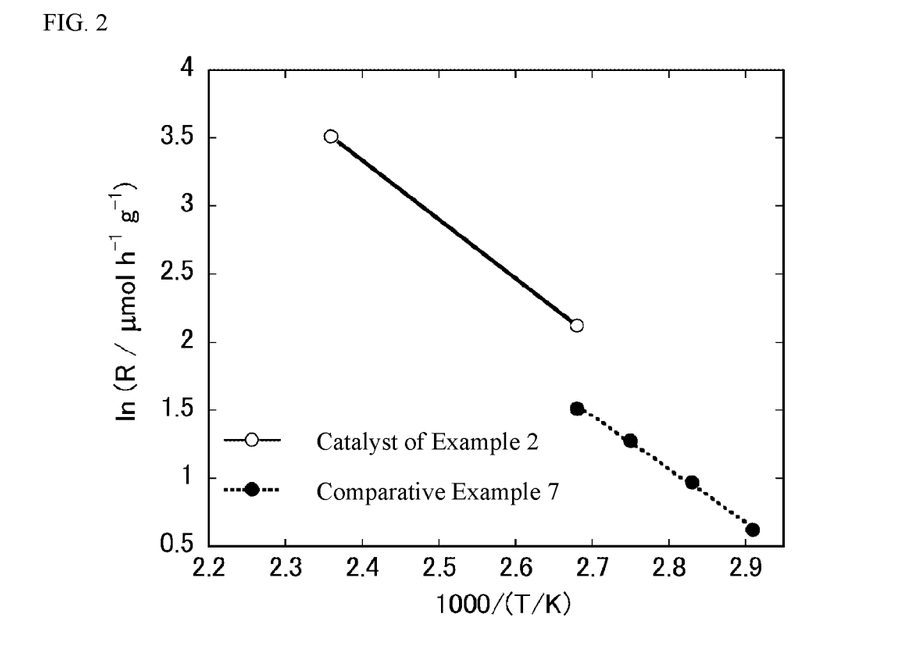
FIG. 2 is a graph showing an Arrhenius plot in which the horizontal axis represents the reciprocal of the absolute temperature corresponding to reaction temperature T in FIG. 1, and the vertical axis represents the natural logarithm of reaction rate R in FIG. 1.

FIG. 1 shows that Amberlyst 15 catalyst of Comparative Example 7 has low heat resistance and cannot be used at temperatures higher than 100° C. In contrast, the catalyst of Example 2 can be used even at temperatures higher than 100° C. and provides a significantly increased rate at 150° C. FIG. 2 shows an Arrhenius plot in which the horizontal axis represents the reciprocal of the absolute temperature corresponding to the reaction temperature T in FIG. 1, and the vertical axis represents the natural logarithm of the reaction rate R in FIG. 1.

In FIG. 2, the four plots for the catalyst of Comparative Example 7 are on a straight line, which indicates successful measurement of the reaction rate. It is apparent that the catalyst of Example 2 provides a rate significantly higher than that at the same temperature (100° C.) in Comparative Example 7. It is also apparent that even when the temperature is raised to 150° C., the catalyst of Example 2 provides an increase in rate with substantially the same slope as that for the catalyst of Comparative Example 7 and does not show thermal degradation.

Example 14

A stack (about 1 g) of 50 circular cut pieces (each 3 cm in diameter, 7 cm$^2$, about 20 mg) of a 100% cellulose nonwoven fabric (BEMCOT M-3II manufactured by Asahi Kasei Corporation) was placed in an autoclave vessel. About 35 ml of an aqueous solution of only boric acid (1.00 g) was also added to the autoclave vessel so that the nonwoven fabric was completely immersed in the solution. The nonwoven fabric immersed in the solution was autoclaved at 120° C. for 12 hours. The resulting sample was taken out and treated in the air at 400° C. (by being kept for 1 hour in a furnace maintained at 400° C. in advance). As a result, about 0.46 g of a sample was obtained from about 1 g of BEMCOT. The sample was then immersed in 30% fuming sulfuric acid (25 ml) in a round bottom flask. The flask was set in a mantle heater, which was set at a temperature of 150° C., and the fuming sulfuric acid was refluxed for 1 hour, so that sulfonic acid groups were introduced into the sample. Subsequently, the sample was taken out, then rinsed many times with pure water, and then boiled in water at 80 to 100° C. for 1 hour. The sample was then dried at 50° C. for 1 hour to give a carbon-based solid acid. The acidity of the resulting carbon-based solid acid was measured as in Example 1. The rate of cellulose decomposition reaction was then measured by the procedure described below using the carbon-based solid acid obtained in Example 14.

[Measurement of Cellulose Hydrolysis Rate]

Cellulose is a natural polymer of glucose units linked by β-glycosidic bonds, from which glucose is produced when all glycosidic bonds are cleaved by hydrolysis. In fact, however, the decomposition of cellulose into glucose is much more difficult than that of cellobiose, because cellulose is a crystalline solid. Therefore, the β-glycosidic bonds of cellulose insoluble in water were partially cleaved by hydrolysis at a reaction temperature of 150° C. to produce water-soluble oligosaccharides, and the total amount of the produced water-soluble oligosaccharides was determined in the evaluation of the catalytic performance of the carbon-based solid acid of the present invention.

Specifically, the rate (μmol/h/g) of cellulose hydrolysis was measured as described below using, as a catalyst, the carbon-based solid acid obtained in Example 14. Water (3 ml), the carbon-based solid acid obtained in Example 14 (its weight is indicated in the parentheses [ ] in Table 10), 15 mg of a cellulose powder (Microcrystalline Cellulose 102331 manufactured by Merck KGaA), and a stirring bar were added to a Teflon inner vessel in a pressure-resistant reaction vessel (Uniseal Decomposition Crucible), and the vessel was tightly closed with a Teflon lid and a stainless steel jacket. The reaction vessel was placed in a mantle heater, and the space was filled with aluminum alloy beads (Lab Armor Beads manufactured by Lab Armor) as heat transfer media. The upper part was further covered with quartz wool so that the whole of the reaction vessel could be heated. Stirring was performed by rotating the stirring bar in the reaction vessel using a magnetic stirrer (CCX-CTRL2 manufactured by TOKYO RIKAKIKAI CO., LTD.) placed under the mantle heater. The reaction was allowed to proceed by heating the mantle heater while the temperature inside the reaction vessel was controlled to be 150° C. using a temperature controller (DSP20 manufactured by SHIMADEN CO., LTD.). After a lapse of 2 hours, the heating was stopped, at which the first reaction was completed. The contents in the reaction vessel were subjected to centrifugation so that the catalyst and the unreacted cellulose powder were allowed to precipitate. The total amount of soluble saccharides in the supernatant of the reaction liquid was determined by high-sensitivity phenol-sulfuric acid method (Takeuchi et al., Research Bulletin of Obihiro University Natural Science, 22 (2001) 103-107). The rate (μmol/h/g) of production of soluble saccharides was determined from the total amount (glucose-equivalent amount) of soluble saccharides in the liquid, the amount of the catalyst used, and the reaction time.

After the supernatant of the reaction liquid was collected, 3 mL of water was added to the residual precipitate layer so that the catalyst could be recovered, and then the mixture was subjected to filtration. The recovered carbon-based solid acid (containing the unreacted cellulose powder) was cleaned by being rinsed with 5 mL of ion-exchanged distilled water and then dried at room temperature. Subsequently, 15 mg of a fresh cellulose powder was added to the recovered carbon-based solid acid and then subjected to the second reaction. Thereafter, the reaction was repeated in the same manner, and the rate of cellulose hydrolysis was measured three times. Table 10 shows the results of the measurement of the cellulose hydrolysis rate and the cellulose hydrolysis rate retention (defined as [the third yield]/[the first yield]×100(%)).

TABLE 10

| | Acidity (mmol/g) | Cellulose hydrolysis rate (μmol/h/g) (catalyst weight (mg) in [ ]) | | | |
|---|---|---|---|---|---|
| | | First | Second | Third | Retention (%) |
| Example 14 | 3.8 | 170 [68] | 165 [45] | 307 [28] | 181 |

Table 10 shows that a solid acid with a high sulfonic acid group content is obtained in Example 14 where cellulose is used as a precursor for the catalyst. Since a nonwoven fabric of cellulose is used as the precursor, the resulting solid acid remains in the form of a nonwoven fabric before subjected to the reaction. Cellulose as a reactant is also in the form of a powder. In general, therefore, the reaction between such a solid reactant and a solid catalyst is difficult to perform because "solid-solid" contact is required to allow the reaction to proceed. As shown in Table 10, however, a cellulose decomposition reaction was successfully performed at a high reaction temperature of 150° C. using, as a catalyst, the carbon-based solid acid obtained in Example 14.

The catalyst in the form of a nonwoven fabric was disintegrated into a powder by repeating the reaction because the catalyst and the cellulose powder were vigorously stirred with the stirring bar during the reaction. Therefore, it was difficult to completely recover the catalyst by filtration, and the amount of the catalyst was smaller in the second or third reaction than in the first reaction. The unreacted cellulose residue was also a powder, which was not able to be separated from the catalyst powder. The catalyst recovered after the completion of the third reaction contained cellulose and therefore apparently had a whitish color tone in contrast to the black color of the original catalyst. Therefore, the amount of the catalyst at the second and third times indicated in the parentheses [ ] in Table 10 contains the weight of the unreacted cellulose powder and thus is larger than the actual amount of the catalyst. The substantial amount of the reactant (cellulose) is also larger in the second and third reactions than in the first reaction because a fresh cellulose powder is added in the second and third reactions. Therefore, the second and third reactions were performed under larger load conditions with a smaller amount of the catalyst and a larger amount of the reactant than in the first reaction. Despite such conditions, the rate of the second reaction is almost equal to that of the first reaction, and the rate of the third reaction is significantly higher (the weight of the catalyst indicated in the parentheses [ ] is used as the amount of the catalyst in the calculation of the reaction rate).

As shown above, cellulose hydrolysis was repeatedly performed using the carbon-based solid acid of the present invention as a catalyst. As a result, it has been found that the carbon-based solid acid of the present invention provides a very high hydrolysis rate retention and can be repeatedly used as an acid catalyst.

The invention claimed is:

1. A carbon-based solid acid catalyst comprising a sulfonic acid group-bearing carbonaceous material, wherein the carbon-based solid acid is obtained by the sulfonation of a carbonized boron-containing carbonaceous material precursor using a source of sulfonic acid that is effective in a chemical reaction in which the carbon-based solid acid can act as a solid acid catalyst, wherein the carbonaceous material has at least a partially graphene structure and contains boron from the boron-containing carbonaceous material precursor, wherein the carbon-based solid acid catalyst has an acidity of 1.0 mmol/g or more as measured by titration after washing the carbon-based solid acid catalyst with water having a temperature of 80° C. or more, and wherein the carbon-based solid acid catalyst further comprises a boron content in the range of 0.0001% by mass to 0.004% by mass based on the overall mass of the carbon-based solid acid catalyst.

2. The carbon-based solid acid catalyst according to claim 1, wherein the carbonaceous material is derived from at least one carbonaceous material precursor selected from the group consisting of a carbohydrate, an aromatic compound, and a resin.

3. The carbon-based solid acid catalyst according to claim 1, wherein the carbon-based solid acid catalyst has an acidity of 1.5 mmol/g or more as measured by titration after washing the carbon-based solid acid catalyst with water having a temperature of 80° C. or more.

4. The carbon-based solid acid catalyst according to claim 1, wherein the carbon-based solid acid catalyst further comprises a porous material on which the carbonaceous material is supported.

5. A solid acid catalyst comprising the carbon-based solid acid catalyst according to claim 1.

6. A method for producing a carbon-based solid acid catalyst of claim 1, the method comprising:
  a boron doping step comprising mixing a carbonaceous material precursor and a boron-containing compound;
  a carbonizing step comprising heating a boron-containing carbonaceous material precursor to carbonize at least part of the boron-containing carbonaceous material precursor, wherein the boron-containing carbonaceous material precursor is a product obtained through the boron doping step; and
  a sulfonic acid group introducing step comprising mixing a boron-containing carbonaceous material with at least one selected from the group consisting of concentrated sulfuric acid, fuming sulfuric acid, and sulfur trioxide, wherein the boron-containing carbonaceous material is a product obtained through the carbonizing step.

7. The method according to claim 6, the method further comprising the step of depositing the boron-containing carbonaceous material precursor on a porous material after the boron doping step.

* * * * *